United States Patent

Nichols, Jr.

[15] 3,685,722
[45] Aug. 22, 1972

[54] SOLIDS-LIQUID SEPARATING CENTRIFUGE

[72] Inventor: George Edwin Nichols, Jr., Norfolk, Mass.

[73] Assignee: Bird Machine Company, South Walpole, Mass.

[22] Filed: May 22, 1969

[21] Appl. No.: 826,879

[52] U.S. Cl. ..............................233/23 R, 64/15 C
[51] Int. Cl. .....................................................B04b 9/00
[58] Field of Search .......64/11, 15, 28, 27; 233/2, 8, 233/7, 23, 24, 1 C, 1 R, 23 R; 112/220

[56] References Cited

UNITED STATES PATENTS

| 1,280,033 | 9/1918 | Holy | 64/15 C X |
| 1,284,683 | 11/1918 | Holy | 64/15 C |
| 2,283,457 | 5/1942 | Pecker | 233/2 |
| 2,476,377 | 7/1949 | Leclair | 233/23 R X |
| 3,336,765 | 8/1967 | Fawick | 64/15 |
| 3,473,349 | 10/1969 | Tateyama | 64/15 X |
| 2,743,865 | 5/1956 | Graae | 233/7 |
| 2,966,810 | 1/1961 | Hayes | 112/220 X |
| 2,907,517 | 10/1959 | Ziherl | 233/7 |
| 3,343,786 | 9/1967 | Sharples | 233/7 |

FOREIGN PATENTS OR APPLICATIONS

| 940,280 | 3/1956 | Germany | 233/23 R |
| 1,131,579 | 10/1968 | Great Britain | 233/7 |

Primary Examiner—Jordan Franklin
Assistant Examiner—George H. Krizmanich
Attorney—Edgar H. Kent

[57] ABSTRACT

Chatter in continuous centrifuges is avoided or reduced by connecting together parts of the assembly of bowl, conveyor and differential gearing in drive-driven relation by resilient, flexible connection means which has a substantially lower spring rate than the other parts of the assembly and which is capable of withstanding without slip or fracture torque greater than the torque on the conveyor produced at maximum rated loading.

4 Claims, 6 Drawing Figures

PATENTED AUG 22 1972　　3,685,722
SHEET 2 OF 2
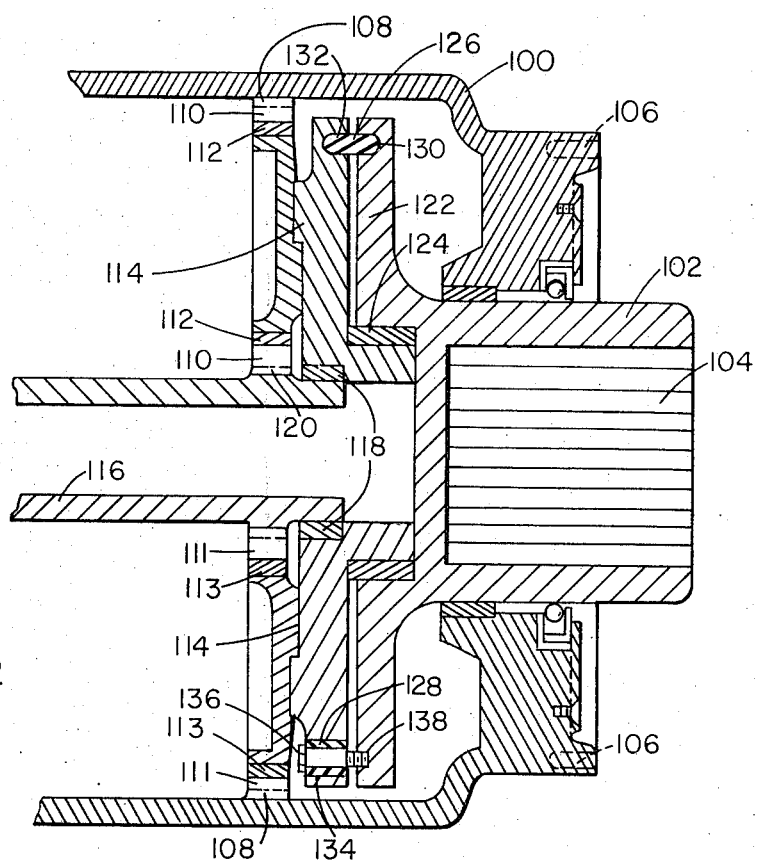
FIG. 2
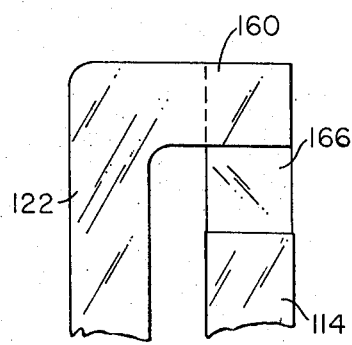
FIG. 4
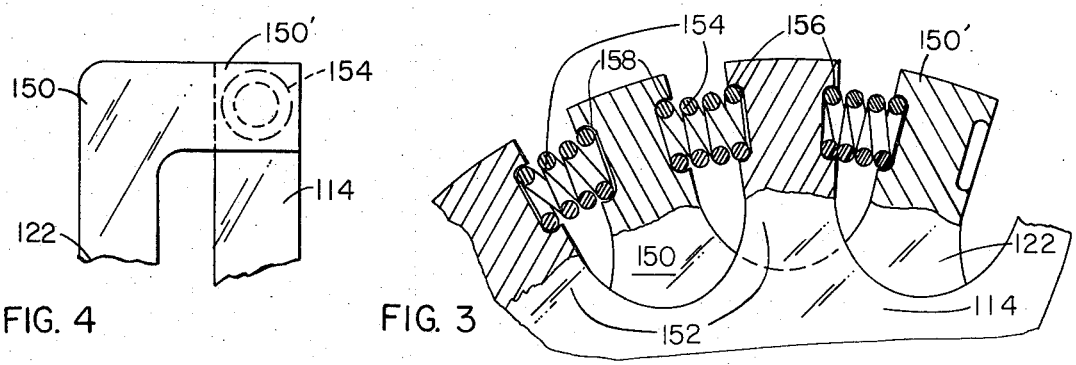
FIG. 3
FIG. 6
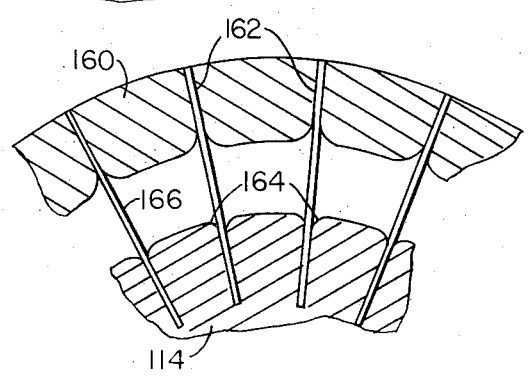
FIG. 5

SOLIDS-LIQUID SEPARATING CENTRIFUGE

This invention relates to centrifuges of the continuous type in which a bowl, imperforate or perforate, and a conveyor are rotated at high speeds in the same direction but at a differential speed. More particularly the invention concerns improvements in the transmission of torque through the interconnected assembly of bowl, conveyor and differential gearing of such centrifuges to eliminate or reduce chatter.

In centrifuges of the type concerned one of the relatively rotating members, normally the bowl, is driven at a high speed by electrical or other drive connections, and the other such member is driven at a small speed differential through differential gearing connections to the shaft of the first member. For years, under certain conditions, there has been encountered in such centrifuges a problem of so called "chatter," particularly at high loadings, which refers to frequent large fluctuations in torque on the conveyor which are reflected through the rest of the assembly, causing strain on the gears and particularly producing vibration of the stationary gear shaft of the differential gearing causing rapid fatigue of its shear pin which soon breaks, making the machine inoperative. The cause of chatter is a matter of speculation but apparently the nature of the solids being processed is an important factor since chatter is most frequently encountered in processing slurries of which the solids are of a peculiar nature, such as starch, certain salts and certain sewage sludges, in that they do not convey smoothly but rather in a series of jerky, stick-slip movements. Throughput, speed and pool depth also seem to be contributing factors in chatter. Whatever the cause, the only solutions available have been the relatively poor choices of either operating below optimum or desired output, or facing abnormally high replacement cost for the differential gearing plus expensive downtime due to frequent breakage of the shear pin.

Accordingly it is an object of this invention to provide a means of eliminating or reducing chatter in such centrifuges. Another object is to provide such a means which is relatively inexpensive to make.

I have discovered that centrifuge chatter is significantly affected by the lowest spring rate (resistance to torsional distortion about the axis of rotation) of the components and their connections making up the assembly of bowl, conveyor and differential gearing. In the past, these have been rigid with a consequent high spring rate and sudden increases of torque load on the conveyor are largely transmitted thereby throughout the assembly.

In accordance with the present invention there is interposed between at least two components of the assembly of bowl, conveyor and differential gearing, these components being in drive-driven relation to each other, resilient, flexible connection means which has a relatively low spring rate compared with the other parts of the assembly. In preferred embodiments, these components are either in the differential gearing or connect the differential gearing to the conveyor. The introduction of such low spring rate resilient, flexible connection means into the assembly substantially reduces or eliminates chatter, apparently because it reduces the extent to which sudden increases in torque load are transmitted through the assembly.

The resilient, flexible connection means should not only have a shear strength capable of withstanding maximum overload (shear pin strength) but should also have a resistance to slip under torque at least equal to the torque on the conveyor at maximum rated load conditions. Suitable media for the resilient, flexible connection means are elastomer such as rubber, or springs, coil or finger type, having the requisite low spring rate, high shear strength and high resistance to slip.

In the accompanying drawings:

FIG. 2 is a transverse section view of the second stage gearing and drive connections of the differential gearing modified to include resilient, flexible connection means according to the invention;

FIG. 3 is a fragmentary view, partly in plan, partly in section of a modification of certain parts shown in FIG. 2;

FIG. 4 is a side elevation view of the parts shown in FIG. 3;

FIG. 5 is a fragmentary plan view of another modification of certain parts shown in FIG. 2;

FIG. 6 is a side elevation view of the parts shown in FIG. 5.

Figure 1:
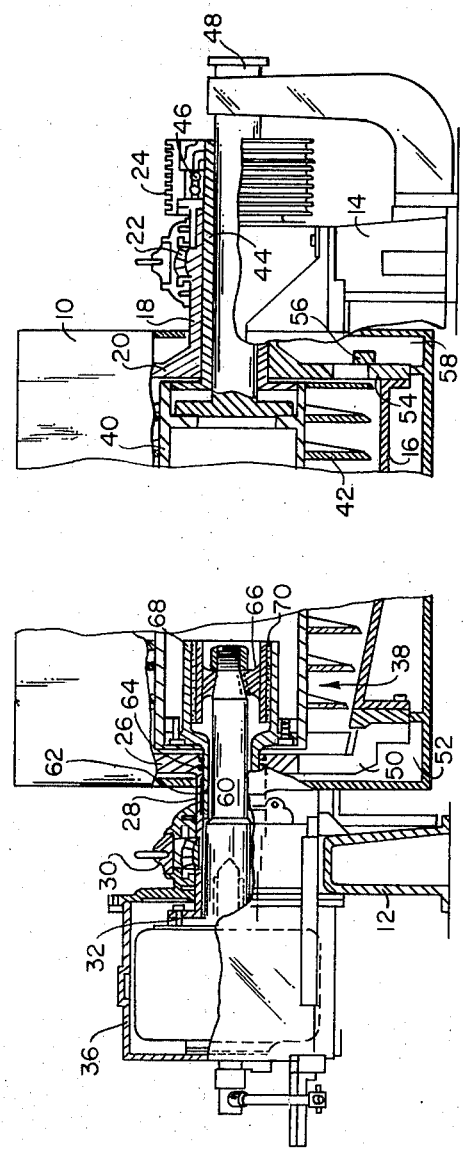
FIG. 1 illustrates partially in side elevation, partially in vertical section, with intermediate portion broken away, a centrifuge of the solid bowl continuous type in which the conveyor is the member driven through speed differential gearing and the drive connections from the gearing to the conveyor include resilient, flexible connection means according to the invention.

Referring first to FIG. 1 of the drawings, the centrifuge there shown has a stationary casing 10 which is mounted between supports 12 and 14. Rotatable within the casing is the centrifuge bowl 16 having at its right hand end a hollow drive shaft 18 which is fixed to bowl head 20 and which extends through a bearing 22 on support 14 to a drive sheave 24 fixed to its outer end by which the bowl is driven by belt connections to a motor or other source of power (not shown). The left hand bowl head 26 has fixed thereto a hollow shaft 28 which extends through a bearing 30 on support 12 to an end flange 32 which is connected by bolts to the driven element of the differential gearing indicated generally at 34, located within a housing 36 mounted on support 12.

A conveyor designated generally 38, which is rotatable within and relative to bowl 16, has a hollow hub 40 which carries on its outer surface helical conveyor flights 42. The conveyor has at its right hand end a hollow shaft 44, which is rotatably journaled within shaft 18 and bearings 46 in sheave 24 and is rotatable about slurry feed pipe 48 which opens into hub 40 from which the slurry is discharged to the bowl through openings (not shown). Relative rotation of the bowl and conveyor causes the solids separating toward the bowl under centrifugal force to be progressed by conveyor flights 42 toward the left hand conical end of bowl 16 from which the solids are discharged through openings 50 in bowl head 26 into a discharge compartment 52 in housing 10. The effluent liquid flows out through openings 54 in bowl head 20 and over adjustable weir 56 into effluent discharge compartment 58 of housing 10.

The structure so far described is a conventional one. Referring now to the improved resilient, flexible drive connections according to the invention, the conveyor drive gear of differential gearing 34 may as usual have a spline connection to a solid drive shaft 60. However, instead of bolting this shaft to the conveyor hub as has been customary in the past, it extends with clearance through a trunnion sleeve 62 fixed to the conveyor hub and rotatable in bearings 64 in bowl head 26. Fixedly attached to the outer end of shaft 60 in conveyor hub 40 is a cylindrical hub 66 which is surrounded by an enlarged cylindrical end 68 of trunnion sleeve 62. Between parts 66 and 68 there is interposed an elastomeric sleeve 70 which may be of rubber or rubber composition having the required characteristics previously set forth. In order to reduce the relative slip potential between them, sleeve 70 at least has a very tight friction fit between parts 66, 68 and preferably is adhesively bonded to one or both of them.

As an example of the chatter-reducing effectiveness of the drive connections according to the FIG. 1 embodiment of the invention, chatter trouble was encountered with two solid bowl continuous centrifuges of the general type shown in FIG. 1 processing potato starch. Both centrifuges had a rated capacity of over 2,000 pounds per hour dry solids but had differential drive gearing of different designs. However, in both centrifuges the spline drive shaft on the drive gear was fixedly bolted to the conveyor hub as usual. One, herein designated "centrifuge A," would not operate without chatter above a throughput of 200 pounds per hour dry solids while the other encountered chatter when the throughput was above 1,200 pounds dry solids per hour. In both cases, substitution of the resilient, flexible connector drive of the invention having the preferred form illustrated in the drawing raised the chatter-free operating capacity on the same material to more than 2,000 pounds per hour dry solids. The spring rate of the former rigid connection was measured in pound inches per minute of deflection as 600 pound inches for centrifuge A centrifuge and 267 pound inches for the other centrifuge. With the resilient, flexible connector the spring rate was only 45 pound inches in each case. The elastomer sleeve, which was of rubber adhered to the drive shaft hub and friction fit to the trunnion, would transmit up to 25,000 pound inches of torque without slip or fracture, which was above shear pin strength (overload).

The resilient, flexible drive interconnection shown in FIG. 1 is preferred because of its simplicity and reliability. However, the resilient, flexible connection means may take other forms and be located between other parts of the assembly which are in drive-driven relation. FIG. 2 shows two different modified forms of such connection means interposed between the second stage gears of a two stage differential speed drive and the output drive shaft driven from these gears.

FIG. 2 shows the drive output end of a gear box 100 which is rotated at the speed of either the bowl or the conveyor to provide through its differential gearing a different speed of rotation on its output spline shaft 102. In the instance shown, output shaft 102 has a splined socket 104 suitable for receiving a splined end on the conveyor shaft and gear box 100 has in its end web rotatably surrounding shaft 102 sockets 106 for bolting to the end flange of the bowl shaft such as flange 32 in FIG. 1.

A ring gear 108 on the inside of gear box 100 meshes to rotate a pair of ring planet gears 110, 111 at opposite sides of the axis of the gearing. Gears 110, 111 are rotatable on bushings 112, 113 on hubs fixed to second stage gear cage 114 which is mounted for rotation about second stage pinion 116 on bushing 118. Gears 110 and 111 are also in mesh with teeth 120 of pinion 116 so that rotation of gears 110, 111 by ring gear 108 causes gear cage 114 to rotate about the axis of pinion 116. Pinion 116 is also rotated in the same direction as gear box 100 but at a slower speed by first stage gearing (not shown) which is similar to the second stage gearing except that the pinion around which the rotation of planet gears 110, 111 by ring gear 108 on gear box 100 causes these gears to orbit around pinion 116 rotating cage 114 about the axis of the pinion since the teeth of these gears are in a mesh with the teeth of pinion 116 as well as the faster rotating gear 108. To understand the operation of the gearing shown it should be appreciated that two or more stages are provided because it is impractical to provide the desired small differential reduction in a single stage. If pinion 116 were fixed as in the first stage gearing, gears 110, 111 would be rotated about their axes for each complete orbit around the pinion axis an amount determined by the ratio of the number of teeth on the pinion to the number of teeth on each of these gears. Cage 114 is therefore rotated at a slower rate than the speed of gear box 100 and gear 108, the speed differential being determined by the amount of rotation of gears 110, 111 in each orbit. This speed differential is larger than desired and hence is applied as the output from the first stage gearing to rotate pinion 116. Rotation of pinion 116 reduces the amount of rotation of gears 110, 111 on each orbit as compared with their rotation with the pinion fixed, and consequently produces a speed of rotation of cage 114 between that of the pinion and that of gear box 100 and gear 108, which in this instance is the desired reduced speed applied from cage 114 to output shaft 102.

In such gearing as heretofore constructed output shaft 102 has been rigidly connected to cage 114 of the second stage planet gears for rotation thereby. In the construction shown in FIG. 2, however, shaft 102 is provided at its inner end with an annular flange 122 spaced from and facing cage 114 and rotatable relative thereto on a bushing 124 mounted on a central hub projecting from cage 114. In accordance with the invention the drive connection between cage 114 and flange 122 is in the form of resilient, flexible connectors which may be of various types, two such being shown in the drawings at 126 and 128. Connector 126 is an elastomeric plug which has its ends friction fit and preferably cemented in opposed sockets 130 and 132 in flange 122 and cage 114 respectively. Connector 128 is an elastomeric bushing which extends through an aperture 134 in cage 114 and is held therein under compression against flange 122 by bolt 136 having a shank fitting the interior of bushing 124 and having a threaded end received in a threaded socket 138 in flange 122.

As many plugs 126 and/or bushings 128 are used as may be required to provide the desired low spring rate but high shear strength. The use of bushings such as 128 and bolt connections is preferable both from the standpoint of shear strength and because compressibility of the bushing by the bolt provides a desirably adjustable resilience and spring rate for the connections.

FIGS. 3 and 4 show modified connections in which flange 122 is provided with radially extending fingers 150 at its periphery, these fingers having a laterally projecting top portion 150' which extends into the space between radial fingers 152 on cage 114. Coil springs 154, fastened at their opposite ends in opposed sockets 156, 158 in the sides of fingers 152 and finger portions 150' respectively, provide a low spring rate connection means according to the invention.

FIGS. 5 and 6 show still another modification in which flange 122 is provided at its periphery with a laterally projecting rib 160 which extends over the periphery of cage 114. Rib 160 and the periphery of cage 114 are provided with opposed slots 162 and 164 respectively in which are fastened the opposite ends of flat springs elements 166, these elements providing the resilient connection means.

Resilient connectors according to FIGS. 2-6 may be used in addition to or in place of the resilient flexible sleeve connection of FIG. 1. In large centrifuges, use of both types of connections may be particularly desirable. It should also be understood that resilient flexible connection means having any of the forms shown in the drawings or having other forms providing the requisite characteristics may be used between other parts of the assembly which are in drive-driven relation. For example, such connections may be used between the second stage pinion 116 and the first stage planet gear cage which rotates it, or between the bowl and gear box 100 in place of the bolt connections indicated in FIG. 2. Usually, however, it is preferred to have the resilient connection means between the gears and the conveyor as in the drawings since this effectively shields the gears from sudden torque loads on the conveyor.

The invention is applicable to all designs of centrifuge have differential gearing between the bowl and the conveyor whether they be solid bowl machines with countercurrent flow as shown, or with concurrent flow using scoops for effluent removal, or partially or entirely perforate bowl machines and whether the element directly connected to the power source is the bowl, the conveyor or, as is done in some cases, the gear box.

I claim:

1. In a solids-liquid separating centrifuge of the type having a bowl and a conveyor one of which is rotated from a source of power and the other of which is rotated in the same direction at a differential speed by differential gearing connected between them, said gearing having a rigid high resistance to torsional distortion, said bowl, conveyor and gearing constituting an assembly of successive components each of which is connected to drive the next, the improvement for substantially reducing chatter which comprises resilient, flexible connection means between said conveyor and said gearing, said resilient, flexible connection means having a substantially lower resistance to torsional distortion about its axis of rotation relative to that of said gearing, said connection means arranged to flex only under forces applied thereto about the axis of rotation of the components connected thereby and to have a low resistance to torsional distortion about said axis which reduces the extent to which sudden increases in torque load are transmitted to said gearing when conditions in said conveyor and bowl are such as to cause chattering and having the capacity to transmit without slip or fracture torque in excess of that produced on said conveyor at a maximum rated loading on the centrifuge.

2. A solids-liquid separating centrifuge as set forth in claim 1 wherein said means is an elastomer.

3. A solids-liquid separating centrifuge as set forth in claim 1 wherein said means are springs.

4. A solids-liquid separating centrifuge as set forth in claim 1 wherein said conveyor has a trunnion, a shaft is connected at one end to said gearing and telescopically received at the other end in said trunnion, and said means comprises a sleeve of elastomer interposed between the telescoped surfaces of said trunnion and said shaft.

* * * * *

UNITED STATES PATENT OFFICE
CERTIFICATE OF CORRECTION

Patent No. 3,685,722    Dated August 22, 1972

Inventor(s) George Edwin Nichols, Jr.

It is certified that error appears in the above-identified patent and that said Letters Patent are hereby corrected as shown below:

Col. 3, line 41, delete "centrifuge".

Col. 4, line 15, insert after "which", --the planet gears orbit is fixed.--

Col. 4, line 15, capitalize "the" before "rotation".

Col. 4, line 19, delete "a".

Col. 5, line 21, change "springs" to --spring--.

Col. 5, line 22, after "resilient", insert --flexible--.

Col. 5, line 36, after "resilient", insert --flexible--.

Signed and sealed this 23rd day of January 1973.

(SEAL)
Attest:

EDWARD M. FLETCHER, JR.
Attesting Officer

ROBERT GOTTSCHALK
Commissioner of Patents